Jan. 23, 1968  A. M. BLESSING  3,365,092

INSULATED FOOD CONTAINER

Filed Dec. 6, 1965

INVENTOR
ANNA M. BLESSING
BY
Don Finkelstein
ATTORNEY

United States Patent Office 3,365,092
Patented Jan. 23, 1968

3,365,092
INSULATED FOOD CONTAINER
Anna M. Blessing, Norwalk, Calif.
(12700 Elliott Ave., Space 200, El Monte, Calif. 91732)
Filed Dec. 6, 1965, Ser. No. 511,935
8 Claims. (Cl. 220—15)

ABSTRACT OF THE DISCLOSURE

There is disclosed herein an insulated food containing arrangement comprising generally a plurality of nested cups. The innermost cup has an individual frictional seal along the upper edge thereof and is utilized for storage of the appropriate food product. The three nested containers are in a spaced apart relationship so that the inner or food containing container is spaced from the intermediate container which, in turn, is spaced from the outermost container. Physical contact between each of the three containers is minimized by providing appropriately shaped spacers and legs for support of the three containers in the spaced apart relationship. The top of the spaces between the inner container and the intermediate container is also provided with a sealing arrangement and the appropriate temperatured medium such as, for example, crushed ice if the food is to be maintained below the ambient temperature or hot water if the food is to be maintained above the ambient temperature is placed in the space between the inner container and the intermediate container. The space between the intermediate container and the outermost container is left as an air chamber to provide additional insulation and minimize heat transfer to and from the medium that is placed in the space between the inner container and the outer container. Therefore, heat transfer and consequent changes in temperature of the medium is minimized and the food in the innermost container is kept at the desired temperature for extended periods of time.

---

This invention relates generally to food containers and more particularly to an insulated food container that may be utilized to maintain foods at a temperature below ambient environment temperature or at a temperature above the ambient environment temperature.

Various types of insulated food containers have heretofore been utilized in the past. In such prior art food containers, there have generally been provided means for maintaining foods or food products at temperatures either above or below the ambient environment temperature. However, in one large classification of food containers, there has not generally been provided any food packaging container arrangement for maintaining foods for comparatively extended periods of time at temperatures below the existing ambient environment temperature. This classification of food containers generally includes food containers such as lunch pails, picnic baskets or the like. Such prior art food containers in this classification, known to applicant, that have attempted to achieve the desirable function of maintaining food or food products at temperatures either above or below the ambient environment have not always proven to be completely satisfactory. For example, such food containers often included comparatively heavy or bulky insulating materials, or have not been designed to accommodate separately a plurality of food products, or were designed to maintain liquid food products and could not accommodate solid food products.

Consequently, there has long been a need for food containers of the class described that can provide the function of either maintaining food products at temperatures above the ambient environment or at temperatures below the ambient environment, in a convenient, comparatively lightweight and attractive package that is adaptable to solids and semisolid food products, as well as to liquid foods.

Applicant achieves the above desiderata by providing, in one embodiment of applicant's invention, a plurality of nested cup-shaped containers. In this embodiment of applicant's invention, there is provided three nested cup-shaped containers which may be delineated as an outer container, an intermediate container, and an inner container. The inner container is provided with a detachable, frictionally sealing lid that seals the food storage chamber derived by the inner container. The inner container is adapted to contain a food product in the food storage chamber at a temperature above or below the existing ambient temperature. For purposes of description, applicant describes his invention in this embodiment as one in which it is desired to maintain a food product at a temperature below the existing ambient environment temperature.

In the preferred embodiment of applicant's invention, the intermediate container is closer to the outer container than to the inner container to provide a larger volume in the first insulating chamber than in the second insulating chamber. Sealing means are also provided to seal the top of the first insulating chamber and the second insulating chamber, and, in a preferred embodiment of applicant's invention, the intermediate container is provided, on the outside surfaces thereof with generally conically shaped spacers to maintain the spacing of the intermediate container from the outer container.

The second insulating chamber, which is defined as the volume between the intermediate container and the outer container is, in the preferred embodiment of applicant's invention, utilized as an insulating air gap chamber to provide insulation by air contained therein.

The first insulating chamber, which is defined as the volume between the inner container and the intermediate container, is filled with ice and then sealed by the sealing means. Food to be maintained at a temperature below the ambient environment temperature is placed in the inner container and the lid is applied to seal the food therein.

The lid that seals the inner container is positioned, with respect to the sealing means sealing the first and second insulating chambers, to allow removal of the lid without detaching the sealing means from either the first insulating chamber or the second insulating chamber. Since the heat transfer from the first insulating chamber, which now contains the ice, is limited by the insulating properties of the second insulating chamber containing air, there is comparatively little heat transfer to the ice from the external environment and the ice will tend to maintain the food placed in the inner container at temperatures below the ambient environment for comparatively extended periods of time.

In other embodiments of applicant's invention, it will be appreciated, a heated fluid, such as hot water, may be placed in the first insulating chamber to maintain food placed in the inner container at a temperature above the ambient environment temperature and, consequently, the heat transfer from such a heated fluid through the second insulating chamber is comparatively low due to the insulating properties thereof and there is provided a means for maintaining foods at an elevated temperature for comparatively long periods of time.

The above and other embodiments of applicant's invention may be more readily understood from the following detailed description taken together with the accompanying drawings, wherein similar reference characters refer to similar elements throughout and in which.

Figure 1:
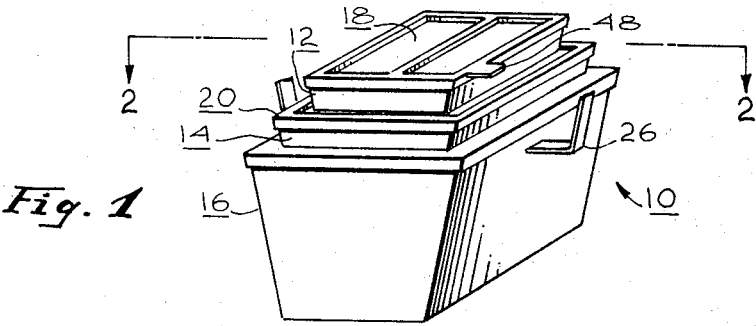
FIGURE 1 is a perspective view of one embodiment of applicant's invention.

While applicant describes the invention herein as being substantially rectangular in cross-section, it will be appreciated that any geometric shape may be utilized in the manufacture of applicant's improved insulated food container. Similarly, the many details of each embodiment as shown in the drawings and described in the specification, may be interchanged in the other embodiments of applicant's invention.

Figure 2:
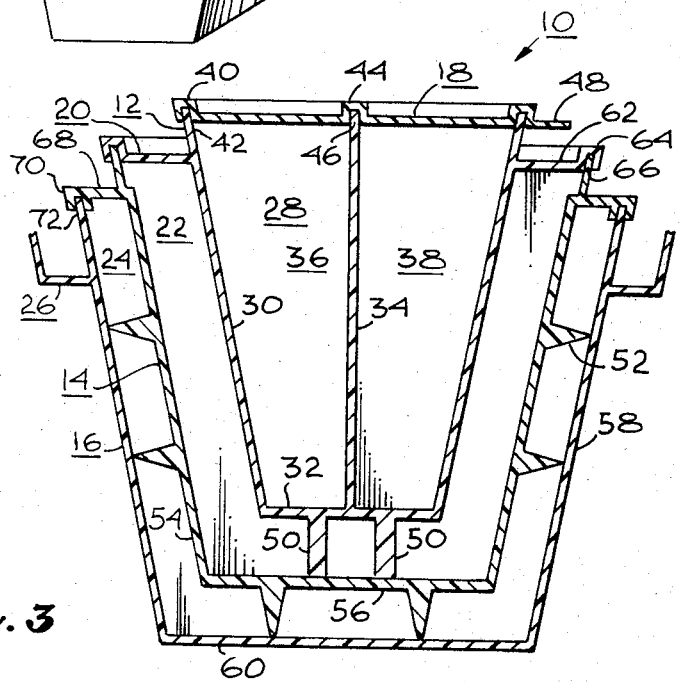
FIGURE 2 is a sectional view along the line 2—2 of FIGURE 1.

Referring now to FIGURES 1 and 2, there is shown one embodiment of applicant's invention that is utilized in a conveniently transportable lunch pail. The lunch pail, generally designated 10 in FIGURES 1 and 2, is comprised of a generally cup-shaped inner container 12 nested in a generally cup-shaped intermediate container 14 which, in turn, is nested in a generally cup-shaped outer container 16. A lid means 18 is utilized to seal the inner container 12 and sealing means 20 is utilized to seal a first insulating chamber 22 formed by the spaced apart relationship of the inner container 12 to the outer container 14 and a second insulating chamber 24 formed by the spaced apart relationship of the intermediate container 14 and the outer container 16. A handle means 26 may, in this embodiment of applicant's invention, also be provided on the outer container 16, if desired, to allow more convenient carrying of the insulated food container 10.

The sealing means 20 for sealing first insulating chamber 22 and second insulating chamber 24 and the lid means 18 utilized to seal the food storage chamber 28 defined by the inner container 12, seal on the respective mating members in a detachable, frictional sealing engagement that allows removal of such members when desired therefrom. Particular types of sealing engagements that applicant prefers are well known in the art and the details of such sealing engagements do not form a part of applicant's invention herein.

Applicant prefers that a material comprising the improved insulated container 10 be selected from rigid or semi-flexible plastic materials such as polystyrene, polyethylene, or other resilient, deformable, thermoplastic materials. These materials should, in the preferred embodiments of applicant's invention, be resilient whereby the distortion created due to local deformability during the sealing engagement is counteracted when the unit is unsealed so that extended operating life may be obtained from the insulated food container 10.

In the embodiment shown on FIGURES 1 and 2, the inner container 12 is provided with peripheral side walls 30 and a base portion 32 that define the food storage chamber 28. There may also be provided, if desired, an upstanding wall portion 34 to divide the food storage volume 28 into separate food storage cavities 36 and 38. It will be appreciated that as many wall portions 34 may be provided in the inner container 12 as desired to divide food storage chamber 28 into as many separate food storage cavities as desired.

Lid means 18 is provided with a first sealing section 40 for detachable, frictional sealing engagement with a top edge 42 of peripheral side walls 30 of the inner container 12. The lid 18 is also provided with a second sealing section 44 for detachable, frictional sealing engagement with a top portion 46 of upstanding wall 34. Thus, the lid 18 seals the food storage chamber 28, and if the upstanding wall portion 34 is utilized, seals separate food storage cavity 36 and 38 so that different foods may be maintained in, for example, food storage cavities 36 and 38, without commingling therebetween.

Lid 18 is also provided, in the preferred embodiment of applicant's invention, with a tab portion 48 to allow convenient removal of the lid 18 when it is desired to remove the food contained in a food storage chamber 28.

Leg portions 50 are coupled to the base portion 32 to provide support to the inner container 12 with respect to the intermediate container 14. As utilized herein, applicant uses the word "coupled" to define a permanent attachment of one part to another. In the preferred embodiment of applicant's invention, the parts that are coupled to one another are formed integrally with such parts, though it will be appreciated, in other embodiments of applicant's invention, such parts may be separate components that are permanently bonded or otherwise attached.

The intermediate container 14 is provided with a plurality of generally conically shaped protuberances 52 that provide and maintain the preselected spacing between the intermediate container 14 and the outer container 16 to define the second insulating chamber 24. In the preferred embodiment of applicant's invention, spacing between peripheral walls 54 of the intermediate container 14 and base portion 56 of the intermediate container 14 from the peripheral walls 58 and base portion 60, respectively, of the outer container 16, is closer than the spacing of the peripheral walls 54 and base portion 56 of the intermediate container 14 from the peripheral walls 30 and base portion 32, respectively, of the inner container 12. This provides that the first insulating chamber 22 is larger than the second insulating chamber 24.

Sealing means 20, in the embodiment of applicant's invention shown on FIGURES 1 and 2, is comprised of a first flange portion 62 coupled to the peripheral walls 30 of the inner container 12 and extending outwardly therefrom. The first flange portion 62 has a sealing section 64 along the outer periphery thereof that is adapted to detachably and frictionally provide sealing engagement with a top portion 66 of the peripheral side wall 54 of the intermediate container 24. Thus, the flange portion 62 provides sealing engagement for sealing the first insulating chamber 22 in this embodiment of applicant's invention.

Sealing means 20 further comprises a second flange portion 68 coupled to the peripheral walls 54 of the intermediate container 14 and extending outwardly therefrom and having a sealing section 70 that is adapted to detachably, frictionally, sealingly engage top portion 72 of the peripheral walls 58 of the outer container 16. Thus, the second flange portion 68 provides a seal for the second insulating chamber 24.

In a preferred embodiment of applicant's invention, top portion 42 of peripheral wall 30 of the inner container 12 is spaced from the sealing means 20 so that the lid means 18 may be removed without detaching the sealing means 20 from either the intermediate container 14 or the outer container 16.

In operation, food that is desired to be maintained at, for example, a temperature below the ambient environmental temperature is placed in the food storage chamber 28. In the embodiments of applicant's invention where an upstanding wall portion 34 is provided, different foods may be placed in each of the separate food storage cavities 36 and 38. Lid 18 may then be placed in detachable, frictional, sealing engagement with the peripheral walls 30 and the upstanding wall 34 to seal the food in the food chamber 28. Ice may then be placed in the first storage volume 22 and the flange 62 may be placed in detachable frictional sealing engagement with the peripheral walls 54 of the intermediate container 14. The flange portion 68 may then be placed in detachable frictional sealing engagement with the peripheral walls 58 of the outer container 16.

It will be appreciated that with the ice in the first insulating chamber 22 and air in the second insulating chamber 24, the food contained in the food storage chamber 28 will be maintained at a temperature lower than the existing ambient environmental temperature, since the heat transfer to the ice under normal ambient temperature conditions will be comparatively small. Therefore, the food in the storage chamber 28 will be maintained at the desired temperature less than the existing ambient environmental temperature.

It will be appreciated also, that the generally cup-shaped inner container 12, generally cup-shaped intermediate container 14, generally cup-shaped outer container 16, all may be utilized separately in various food storage and containing functions when it is not desired to utilize them together to provide the insulated food container 10.

In order to minimize the heat transfer either to or from the medium contained in the first insulating chamber 22, in some embodiments of applicant's invention, applicant prefers to provide that the seal means 20 provides an insulating chamber to act as a heat flow barrier.

Figure 3:
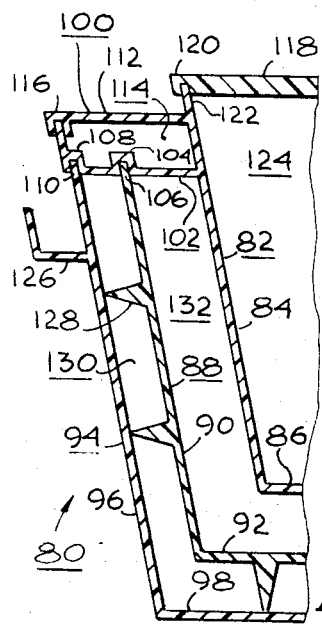
FIGURE 3 is a partial sectional view of another embodiment of applicant's invention.
Figure 4:
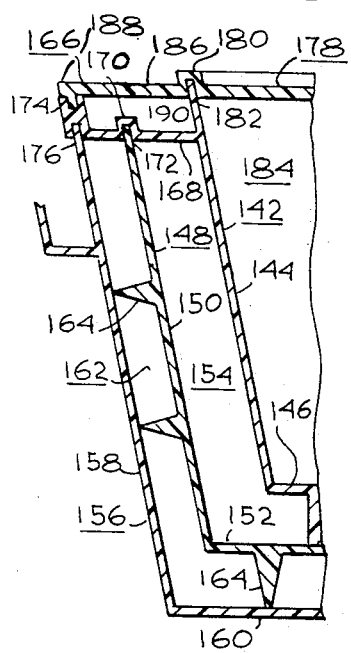
FIGURE 4 is a partial sectional view of another embodiment of applicant's invention.

One such embodiment of an insulated food container is illustrated in FIGURE 3 and another such embodiment of an insulated food container is illustrated in FIGURE 4. As shown in FIGURE 3, there is an insulated food container generally designated 80 that is comprised of a generally cup-shaped inner container 82 having peripheral walls 84 and a base portion 86, a generally cup-shaped intermediate container 88 having peripheral walls 90 and a base portion 92, and a generally cup-shaped outer container 94 having peripheral walls 96 and a base portion 98. These elements may be generally similar to the corresponding elements shown in FIGURES 1 and 2. However, in this embodiment of applicant's invention, a sealing means, generally designated 100, is comprised of a flange portion 102 coupled to the peripheral wall 84 of the inner container 82 and has a first sealing portion 104 for detachable, frictionable, sealing engagement with a top portion 106 of the peripheral walls 90 of the intermediate container 88 and a second sealing section 108 for detachable, frictional, sealing engagement with a top portion 110 of the peripheral walls 96 of the outer container 94. A rim portion 112 is also coupled to the peripheral walls 84 of the inner container 82 and is in a spaced apart relationship to the flange 102 to provide a top insulating volume 114. The rim portion 112 extends outwardly from a peripheral wall 84 of the inner container 82 and has a sealing section 116 for detachable frictional sealing engagement with the flange portion 102 in regions adjacent the second sealing section 108 thereof adjacent the outer container 94. It will be appreciated, of course, that, if desired, the rim portion 112 may be fixedly coupled to the flange portion 102 in regions adjacent the second sealing section 108 to provide a substantially permanently sealed top insulating chamber 114.

A lid means 118 is provided with a sealing section 120 for detachable, frictional, sealing engagement with a top portion 122 of the peripheral wall 84 of the inner container 82 to seal the food storage chamber 124 defined thereby.

A handle means 126 may also be provided in this embodiment of applicant's invention and the handle means 126 may be similar to the handle means 26 shown in FIGURES 1 and 2.

Conically shaped spacers 128 may also be provided to serve the same function as the conical spacers 52 shown in FIGURE 2 to maintain the intermediate container 88 in a spaced relationship to the outer container 94 to define the second storage volume 130. Similarly, the inner container 82 is spaced from the intermediate container 88 to provide the first insulating chamber 132 therebetween. If desired, upstanding wall portions may be utilized in the inner container 82 to divide the food storage chamber 124 into a plurality of separate food storage cabinets.

Utilization of this embodiment of applicant's invention is similar to that described above of the utilization of the embodiments shown in FIGURES 1 and 2. That is, for example, ice may be placed in the first insulating chamber 132 to maintain food in the food storage chamber 124 at a temperature below a normal ambient environmental temperature. Top portion 122 of the peripheral walls 84 of the inner container 82 are spaced from the top portions 106 of the peripheral walls 90 of the intermediate container 88 and top portion 110 of the peripheral walls 96 of the container 94 in order to allow removal of the lid portion 18 without requiring detaching the sealing means 100 from either the peripheral wall 96 of the outer container 94 or the peripheral walls 90 of the intermediate container 88.

FIGURE 4 illustrates another embodiment of applicant's invention wherein an insulating chamber is provided at the top of an insulated food storage container. In this embodiment of applicant's invention shown on FIGURE 4, there is provided a food storage container 140 having an inner container 142 with peripheral wall portions 144 and a base portion 146 spaced apart from, respectively, peripheral walls 150 and base portions 152 of an intermediate container 148 to define a first insulating chamber 154 therebetween. Similarly, the intermediate container 148 is spaced apart from peripheral wall portions 158 and base portion 160, respectively, of outer container 156 to define a second insulating chamber 162. Generally conically shaped spacers 164 may be provided coupled to the peripheral walls 150 of the intermediate container 148 to maintain a spacing of the intermediate container 148 from the outer container 156 to provide the second insulating chamber 162.

In this embodiment of applicant's invention, the sealing means, generally designated 166 for sealing the top of the first insulating chamber 154 and second insulating chamber 162 is provided by a flange portion 168 coupled to the peripheral walls 144 of the inner container 142 and extending outwardly therefrom. Flange portion 168 has a first sealing section 170 thereon for detachable, frictional, sealing engagement with top portion 172 of the peripheral walls 150 of the intermediate container 148, and a second sealing section 174 for detachable, frictional, sealing engagement with a top portion 176 of the peripheral walls 158 of the outer container 156.

In this embodiment of applicant's invention, lid means 178 has a first sealing section 180 for detachable, frictional, sealing engagement with a top portion 182 of the peripheral walls 184 of the inner container 142 to seal the food storage chamber 184 defined thereby. Lid means 178 is also provided with a rim portion 186 extending outwardly from the first sealing section 180 to provide a second sealing section 188 for detachable, frictional, sealing engagement with the flange portion 168 in regions adjacent the second sealing section 174 thereof. The rim portion 186 is spaced apart from the flange portion 168 to provide the top insulating chamber 190 therebetween.

Utilization of the embodiment of applicant's invention shown on FIGURE 4 is similar to the utilization of the embodiments shown in FIGURES 1 and 2 and the embodiment shown on FIGURE 3, as described above. That is, for example, ice may be placed in first insulating chamber 164 to maintain food contained in food storage chamber 184 at a temperature generally below the normal ambient environmental temperature. In this embodiment of applicant's invention, while the second sealing section 188 may be detached from the flange portion 168 in order to remove the lid 178 from the inner container 142 in order to remove food contained within a food storage chamber 184, it will be appreciated that the sealing engagement of the flange portion 168 with the peripheral walls 150 of the intermediate container 148, and the peripheral walls 158 of the outer container 156 remains intact.

It will be appreciated that in the various detachable, frictional, sealing engagement relationships between the elements of applicant's improved storage container as described above, either of the members may be the male and either of the members may be the female member in providing a detachable, frictional sealing relationship in the preferred embodiments of applicant's invention. Similarly, while applicant has indicated generally conically shaped spaces to provide spacing of the intermediate container from the outer container, in order to minimize heat transfer therebetween, by providing such generally conically shaped spacers so that only point contact between the intermediate container and the outer container is made, the effect of "sweating" that is commonly incurred in insulated food containers utilized in the past, and particularly those for providing and maintaining food products at temperatures lower than the ordinary environmental temperatures, is substantially minimized in applicant's improved food storage containers. That is, in general, there will be little condensation occurring on the outside surface of the peripheral wall and base portion of the outer container, since the outer container is generally not cooled below the existing ambient environment temperature. Absence of such condensation occurring on the outer container of applicant's improved insulated food storage container provides an advantage over prior art insulated food containers known to applicant.

In other operational utilizations of the improved food storage container according to applicant's invention herein, it may be desired in some instances to fill the first insulating chamber with water and then place the entire food storage container in a freezing environment to freeze the water and provide a solid ice jacket between the air gap in the second insulating chamber and the first insulating chamber. Such variations in the operational utilization of applicant's improved insulated food storage container may be derived with all structures defining applicant's improved insulated food storage container as exemplified by the preferred embodiments described above.

Those skilled in the art may find many other variations and adaptations of applicant's invention herein. Therefore, the following claims are intended to cover all such variations and adaptations falling within the true scope and spirit of applicant's invention.

What is claimed as new and desired to be secured by Letters Patent of the United States is:

1. An insulated food container comprising, in combination:
    a generally cup-shaped inner container having peripheral side walls and a base portion, and defining a food storage chamber;
    a generally cup-shaped intermediate container having peripheral side walls spaced apart from said peripheral side walls of said inner container, and a base portion spaced apart from said base portion of said inner container, and said inner and said intermediate containers defining a first insulating chamber therebetween;
    a generally cup-shaped outer container having peripheral side walls spaced apart from said peripheral side walls of said intermediate container, and a base portion spaced apart from said base portion of said intermediate container, and said intermediate container and said outer container defining a second insulating chamber therebetween;
    sealing means coupled to said peripheral walls of said inner container and having a flange portion extending outwardly therefrom, and said flange portion having:
        a first sealing section for detachable, frictional, sealing engagement with a top edge portion of said peripheral wall of said intermediate container for detachably sealing said first insulating chamber; and
        a second sealing section spaced apart and outwardly disposed from said first sealing section for detachable, frictional, sealing engagement with a top edge portion of said peripheral walls of said outer container for detachably sealing said second insulating chamber; and
    said sealing means having a rim portion spaced axially outwardly from said flange portion to define a top insulating chamber therebetween, and said rim portion has an inner edge coupled to said peripheral walls of said inner container, and an outer edge detachably, frictionally, sealable to said flange portion in regions adjacent said second sealing section; and
    lid means detachably sealable on a top edge portion of said peripheral walls of said inner container for sealing said food storage chamber, and said top edge portion of said peripheral walls of said inner container positioned, with respect to said sealing means, to allow removal of said lid means without detaching said sealing means.

2. The arrangement defined in claim 1 wherein said inner container has upstanding wall portions in said food storage chamber to divide said food storage chamber into a plurality of separate food storage cavities, and said lid means has a sealing section thereon for detachable, frictional, sealing engagement with top edge portions of said upstanding wall portions to seal said food storage cavities, and said lid means is in detachable, frictional, sealing engagement with said top edge portions of said peripheral walls of said inner container.

3. An insulated food container comprising, in combination:
    a generally cup-shaped inner container having peripheral side walls and a base portion, and defining a food storage chamber;
    a generally cup-shaped intermediate container having peripheral side walls spaced apart from said peripheral side walls of said inner container, and a base portion spaced apart from said base portion of said inner container, and said inner and said intermediate container defining a first insulating chamber therebetween;
    a generally cup-shaped outer container having periph-side walls spaced apart from said peripheral side walls of said intermediate container, and a base portion spaced apart from said base portion of said intermediate container, and said intermediate container and said outer container defining a second insulating chamber therebetween;
    sealing means coupled to said peripheral walls of said inner container and having a flange portion extending outwardly therefrom, and said flange portion having:
        a first sealing section for detachable, frictional, sealing engagement with a top edge portion of said peripheral walls of said intermediate container to detachably seal said first insulating chamber; and
        a second sealing section spaced apart and outwardly disposed from said first sealing section for detachable, frictional, sealing engagement with a top edge portion of said peripheral walls of said outer container for detachably sealing said second insulating chamber; and
    lid means having a first sealing section for detachable, frictional, sealing engagement with top edge portion of said peripheral walls of said inner container for sealing said food storage chamber, and a rim portion extending outwardly therefrom, and said rim portion having a second sealing section for detachable, frictional, sealing engagement with said flange portion of said sealing means in regions adjacent said second sealing section thereof, and said top edge portion of said peripheral walls of said inner container positioned, with respect to said sealing means to allow removal of said lid means without detaching said sealing means.

4. The arrangement defined in claim 3 wherein said inner container has upstanding wall portions in said food storage chamber to divide said food storage chamber into a plurality of separate food storage cavities, and said lid means has a sealing section thereon for detachable, frictional, sealing engagement with top edge portions of said upstanding wall portions to seal said food storage cavities.

5. An insulated food container comprising, in combination:

a generally cup-shaped inner container having peripheral side walls and a base portion, and defining a food storage chamber;

a generally cup-shaped intermediate container having peripheral side walls spaced apart from said peripheral side walls of said inner container, and a base portion spaced apart from said base portion of said inner container, and said inner and said intermediate container defining a first insulating chamber therebetween;

a generally cup-shaped outer container having peripheral side walls spaced apart from said peripheral side walls of said intermediate container and a base portion spaced apart from said base portion of said intermediate container, and said intermediate container and said outer container defining a second insulating chamber therebetween;

sealing means comprising:

a first flange portion having an inner edge coupled to said peripheral walls of said inner container and spaced from said top edge portion thereof, and said first flange portion extending outwardly and having a sealing section for detachable, frictional, sealing engagement with a top edge portion of said peripheral walls of said intermediate container to detachably seal said first insulating chamber; and a second flange portion having an inner edge coupled to said peripheral walls of said intermediate container and spaced from said top edge portion thereof and said second flange portion extending outwardly and having a sealing section for detachable, frictional, sealing engagement with a top edge portion of said peripheral walls of said outer container to detachably seal said second insulating chamber; and lid means detachably sealable on a top edge portion of said peripheral walls of said inner container for sealing said food storage chamber, and said top edge portion of said peripheral walls of said inner container positioned, with respect to said sealing means, to allow removal of said lid means without detaching said sealing means.

6. The arrangement defined in claim 5 wherein said inner has upstanding wall portions in said food storage chamber to divide said food storage chamber into a plurality of separate food storage cavities, and said lid portion has a sealing section thereon for detachable, frictional, sealing engagement with top edge portions of said upstanding wall portions to seal said separate food storage cavities.

7. The arrangement defined in claim 6 wherein said intermediate container has a plurality of conically shaped spacers coupled to outside surfaces of said peripheral walls and said base portion of said intermediate container for maintaining said intermediate container in said spaced-apart relationship to said outer container.

8. The arrangement defined in claim 7 wherein said intermediate container is spaced closer to said outer container than to said inner container.

References Cited
UNITED STATES PATENTS

| | | | |
|---|---|---|---|
| 1,088,194 | 2/1914 | Whitton | 220—9 |
| 1,956,356 | 4/1934 | Justheim | 220—10 |
| 1,970,970 | 8/1934 | Nolan | 220—20 |
| 2,077,216 | 4/1937 | Conner | 220—10 |
| 2,077,217 | 4/1937 | Conner | 220—10 |
| 2,096,825 | 10/1937 | Roman | 220—20 |
| 2,695,732 | 11/1954 | Tupper | 150—.5 |
| 2,731,996 | 1/1956 | Hayes | 220—20 |
| 2,779,578 | 1/1957 | Corey | 220—13 |
| 2,828,903 | 4/1958 | Adkims | 220—15 |

THERON E. CONDON, *Primary Examiner.*

JAMES R. GARRETT, *Examiner.*